(12) United States Patent
Falk

(10) Patent No.: US 9,846,791 B2
(45) Date of Patent: Dec. 19, 2017

(54) DATA STORAGE DEVICE FOR PROTECTED DATA EXCHANGE BETWEEN DIFFERENT SECURITY ZONES

(71) Applicant: SIEMENS AKTIENGESELLSCHAFT, München (DE)

(72) Inventor: Rainer Falk, Poing (DE)

(73) Assignee: Siemens Aktiengesellschaft, München (DE)

( * ) Notice: Subject to any disclaimer, the term of this patent is extended or adjusted under 35 U.S.C. 154(b) by 178 days.

(21) Appl. No.: 14/901,590

(22) PCT Filed: Jun. 4, 2014

(86) PCT No.: PCT/EP2014/061540
§ 371 (c)(1),
(2) Date: Dec. 28, 2015

(87) PCT Pub. No.: WO2014/206695
PCT Pub. Date: Dec. 31, 2014

(65) Prior Publication Data
US 2016/0371510 A1     Dec. 22, 2016

(30) Foreign Application Priority Data
Jun. 27, 2013   (DE) .................. 10 2013 212 525

(51) Int. Cl.
*G06F 21/00*      (2013.01)
*G06F 21/79*      (2013.01)
*G06F 21/60*      (2013.01)

(52) U.S. Cl.
CPC ............ *G06F 21/79* (2013.01); *G06F 21/606* (2013.01)

(58) Field of Classification Search
CPC ........................ G06F 21/79; G06F 21/606
(Continued)

(56) References Cited

U.S. PATENT DOCUMENTS 7,680,712 B2 * 3/2010 Thomson ............. G06Q 10/107
705/30
2003/0070083 A1   4/2003 Nessler
(Continued)

FOREIGN PATENT DOCUMENTS

| CN | 101689234 A | 3/2010 |
| WO | WO2012045984 A1 | 4/2012 |
| WO | WO2012170485 A1 | 12/2012 |

OTHER PUBLICATIONS

Chinese Office Action for related Chinese Application No. 2014 800 366 13.9 dated May 24, 2017, p. 1.

*Primary Examiner* — Haresh N Patel
(74) *Attorney, Agent, or Firm* — Lempia Summerfield Katz LLC

(57) ABSTRACT

The embodiments relate to a data storage device for protected data exchange between different security zones including at least a storage unit, a data validation unit, and an access control unit. The storage unit has a first interface to a first security zone, via which the data elements may only be written to the storage unit. The storage unit also has a second interface to a second security zone, via which data elements may only be read from the storage unit. The validation unit is equipped to check the data elements written to the storage unit for agreement with a predetermined pattern. The access control unit is set up to permit the data elements to be read from the storage unit only when the data elements are found to be in agreement and are thus applicably validated.

18 Claims, 3 Drawing Sheets

(58) Field of Classification Search
USPC .......................................................... 726/16
See application file for complete search history.

(56) References Cited

U.S. PATENT DOCUMENTS

| | | | |
|---|---|---|---|
| 2004/0143710 A1* | 7/2004 | Walmsley | B41J 2/04505 711/144 |
| 2004/0174570 A1* | 9/2004 | Plunkett | B41J 2/04505 358/3.13 |
| 2005/0188820 A1* | 9/2005 | Park | G10H 1/0058 84/603 |
| 2005/0210179 A1* | 9/2005 | Walmsley | B41J 2/04505 711/3 |
| 2006/0061957 A1* | 3/2006 | Yip | G11B 33/12 361/679.33 |
| 2008/0076525 A1* | 3/2008 | Kim | G07C 15/006 463/22 |
| 2009/0307513 A1* | 12/2009 | Kinouchi | G06F 1/26 713/324 |
| 2010/0199083 A1 | 8/2010 | Genissel | |
| 2012/0004770 A1* | 1/2012 | Ooyen | G06F 19/3462 700/235 |
| 2013/0057896 A1* | 3/2013 | Ito | H04N 1/00204 358/1.14 |
| 2013/0212698 A1 | 8/2013 | Tarrago et al. | |
| 2013/0250686 A1* | 9/2013 | Marukame | G11C 16/08 365/185.12 |
| 2013/0254455 A1* | 9/2013 | Shim | G06F 3/0607 711/102 |
| 2014/0047548 A1* | 2/2014 | Bye | G06F 21/74 726/26 |
| 2014/0201479 A1* | 7/2014 | Thanner | G06F 12/0862 711/159 |
| 2014/0335709 A1* | 11/2014 | Chung | H01R 31/06 439/172 |

\* cited by examiner

DATA STORAGE DEVICE FOR PROTECTED DATA EXCHANGE BETWEEN DIFFERENT SECURITY ZONES

This application is the National Stage of International Application No. PCT/EP2014/061540, filed Jun. 4, 2014, which claims the benefit of German Patent Application No. DE 10 2013 212 525.9, filed Jun. 27, 2013. The entire contents of these documents are hereby incorporated herein by reference.

BACKGROUND

The present embodiments relate to a data storage device for protected data exchange between different security zones including at least one storage unit, a data validation unit, and an access control unit.

In special areas, such as communication by authorities, in which high security requirements apply and which involve a security classification of documents and information, cross-domain solutions that realize an automated and secure exchange of documents and messages (e.g., emails) between security zones with different degrees of security are known.

For the coupling of industrial control networks to an office network, the public Internet or other control networks, conventional firewalls that filter the data communication have been used heretofore. In this case, a data communication is permitted or blocked depending on the address of the communication partners and the communication protocol used. It is customary to route a network connection via an application proxy server that terminates the TCP connection.

In WO 2012/170485, a cross-domain security solution is realized based on a virtualization solution in which a virtual machine controls the information transfer between two information domains with different security levels. Such a system includes a computer device with a monitoring unit for virtual machines (VMM), which controls a first virtual machine for a first information domain, a second virtual machine for a second information domain, and a virtual machine for a cross-domain solution. The virtual machine for the cross-domain solution controls the information exchange between the first and second information domains or the corresponding virtual machines.

For data exchange between an office network or a service apparatus and a control network or a control apparatus (e.g., for distributing new programs or instructions), complex solutions with an interposed firewall or virtualization solution are impracticable, particularly if data is intended to be exchanged across different security zones via many distributed interfaces.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a solution for data exchange with a control network or a control apparatus that is realized and used in a simple manner and is free of perturbations and robust against attacks is provided. One or more of the present embodiments may be integratable, for example, into an individual control apparatus or may be realizable as a data lock between two security zones of a control system.

The data storage device according to one or more of the present embodiments for protected data exchange between different security zones includes at least one storage unit, a data validation unit, and an access control unit. The storage unit includes a first interface to a first security zone, via which data elements are only writable to the storage unit. The storage unit also includes a second interface to a second security zone, via which data elements are only readable from the storage unit. The validation unit is configured to check the data elements written to the storage unit for correspondence with a predetermined pattern. The access control unit is configured to enable the data elements to be read out from the storage unit only if the data elements are found to be corresponding and thus validly validated.

The implementation of the data validation on a data storage device (e.g., on a hardware component) makes it possible to carry out a validation with high reliability against manipulation. Using a separate interface in each case to the different security zones, the data storage device according to one or more of the present embodiments may be interposed in a simple manner. The data storage device is constructed in a simple manner and may therefore be realized relatively inexpensively (e.g., in comparison with the previously known cross-domain solutions). The data storage device according to one or more of the present embodiments may be interposed between arbitrary security zones or the corresponding networks and is not restricted to a specific environment. In this case, each security zone may be operated as a closed network since no network communication is realized. Only selected projectable data elements are provided on the other side insofar as a data validation has revealed nothing conspicuous. Freedom from perturbations is likewise provided in the data exchange from an external network to a closed network. Additional data elements are not generated since only data elements read into the data storage device are forwarded, such that no additional data elements are communicated back into the first security zone.

In one embodiment, the storage unit has a plurality of memory cells. A check identifier is assignable to each memory cell, and a check identifier 20 is assigned only to a memory cell 19 with a validly validated data element. The memory cell is enabled for a reading access only in the case of an assigned check identifier. This has the advantage that only one storage unit is required for the data storage device, and the data storage device may thus be realized very compactly and cost-effectively.

In one alternative embodiment, the storage unit has a first storage component that allows write-only access with respect to the first interface and forwards the written data elements to the validation unit. The storage unit also includes a second storage component that reads in data elements from the validation unit and allows read-only access with respect to the second interface.

This has the advantages that the data exchange is carried out by a simple standard procedure (e.g., simple copying over of the data elements). In the case of an unsuccessful data validation, correction of the data elements is possible in a very simple manner.

The data storage device may include a plurality of storage regions. A storage region includes at least one storage unit and/or a validation unit and/or an access unit, and each storage region transports data elements in respectively different directions. The at least one validation unit checks the data elements for each direction for correspondence with a dedicated pattern independent of the opposite direction or the other directions.

This enables a secure manipulation-protected data exchange in different directions (e.g., in outgoing and return directions) independently of one another.

In one exemplary embodiment, the storage regions have a different storage capacity. As a result, the data storage device may be optimized in terms of capacity for a non-symmetrical data flow in different directions.

In one embodiment, the access control unit provides a replacement value or an invalid value or an additional information item for a written data element with a value validated as invalid. This has the advantage that a complete data set may be read out despite a data element validated as invalid, and a control apparatus may continue to operate, for example, with the last valid value before the data transmission or an average value over the last valid values as replacement value.

In another embodiment, the access control unit blocks reading access to a data element if the data element was validated as invalid. This has the advantage that invalid (e.g., corrupted) data elements may not be read out into the second security zone and thus may not manifest a harmful effect there either.

In one embodiment, the access control unit, in the case of one or a specific number of data elements validated as invalid, treats all or a portion of the data elements validated as valid in the same way as the data element validated as invalid. Consequently, all data elements that contain data of a file may be allocated a predetermined value, even if only a single data element of the file is invalid. What is achieved as a result is that an inherently consistent overall data set from a plurality of memory cells is provided.

In one embodiment, the access control unit deactivates the complete data storage device if one or a plurality of written data elements were validated as invalid.

In another embodiment, the access control unit blocks writing access to the storage unit if one or a plurality of data elements were validated as invalid. This blocking of writing access may apply to all or specific accessing entities.

In a further exemplary embodiment, the access control unit, in the case of one or a plurality of data elements validated as invalid, instigates a resetting of the memory cell in which the data element validated as invalid is stored, instigates a resetting of a partial region, or instigates a resetting of all the memory cells of the storage unit. Consequently, the "infected" memory cells of the storage unit are immediately corrected, and so no damage may subsequently arise either.

In one embodiment, at the data storage device, a third interface that is accessible from the first security zone and duplicates and reads out the data elements written via the first interface from the first security zone to the storage unit is provided. As a result, it is possible to intercept written data values within a security zone, but without influencing the communication within the security zone and between the security zones.

In one embodiment, a written data element is embodied as an actuator value. This data element read out into a control environment is usable there directly as input. This has the advantage that, for example, an Internet service may provide a data value, but without a network communication being required for this purpose. As a result, a control environment embodied as a security zone is a closed network.

In a further embodiment, the validation unit is configured to store and/or to load a plurality of different patterns. This enables a comprehensive validation oriented toward a plurality of criteria.

In one embodiment, the validation unit validates data elements with respect to a plurality of patterns, and the access control unit allows a reading access only if at least one or a specific minimum number of patterns or a logical combination of patterns are validly validated.

In one embodiment, a pattern is a format, a file type, a value range, a valid checksum, a correspondence of dependencies of a plurality of data elements with respect to one another, or a temporal dependency of a plurality of data elements.

In one embodiment, the first and/or the second interface is embodied as an interface in accordance with an Inter-Integrated Circuit (I2C), Serial Peripheral Interface (SPI), RS232 (Electronical Industries Alliance-232-F), RS485 (Electronical Industries Alliance-485), Universal Serial Bus (USB), Secure Digital (SD) card standard or an Internet, Profinet Input-Output (IO), Internet Protocol (IP), File Transfer Protocol (FTP), secure copy (scp), hypertext transfer protocol (HTTP), hypertext transfer protocol secure (HTTPS), Constrained Application Protocol (CoAP), OLE for Process Control (OPC) or OLE for Process Control Unified Architecture (OPC UA) standard.

In one embodiment, the data storage device is embodied in the form of a storage assembly as a field programmable logic gate arrangement, an application specific integrated circuit, or a system on an integrated circuit. A realization in hardware affords high protection against manipulation. Such a solution may be realized relatively inexpensively. A data exchange may be carried out in a simple manner since the data elements having data values of a file are provided, for example, as the content of a storage assembly (e.g., of an SD card or a USB stick).

BRIEF DESCRIPTION OF THE DRAWINGS

Exemplary embodiments of the data storage device are illustrated by way of example in the drawings and are explained in greater detail on the basis of the description below. In the figures.

DETAILED DESCRIPTION

Parts corresponding to one another are provided with the same reference signs in all the figures.

Figure 1:
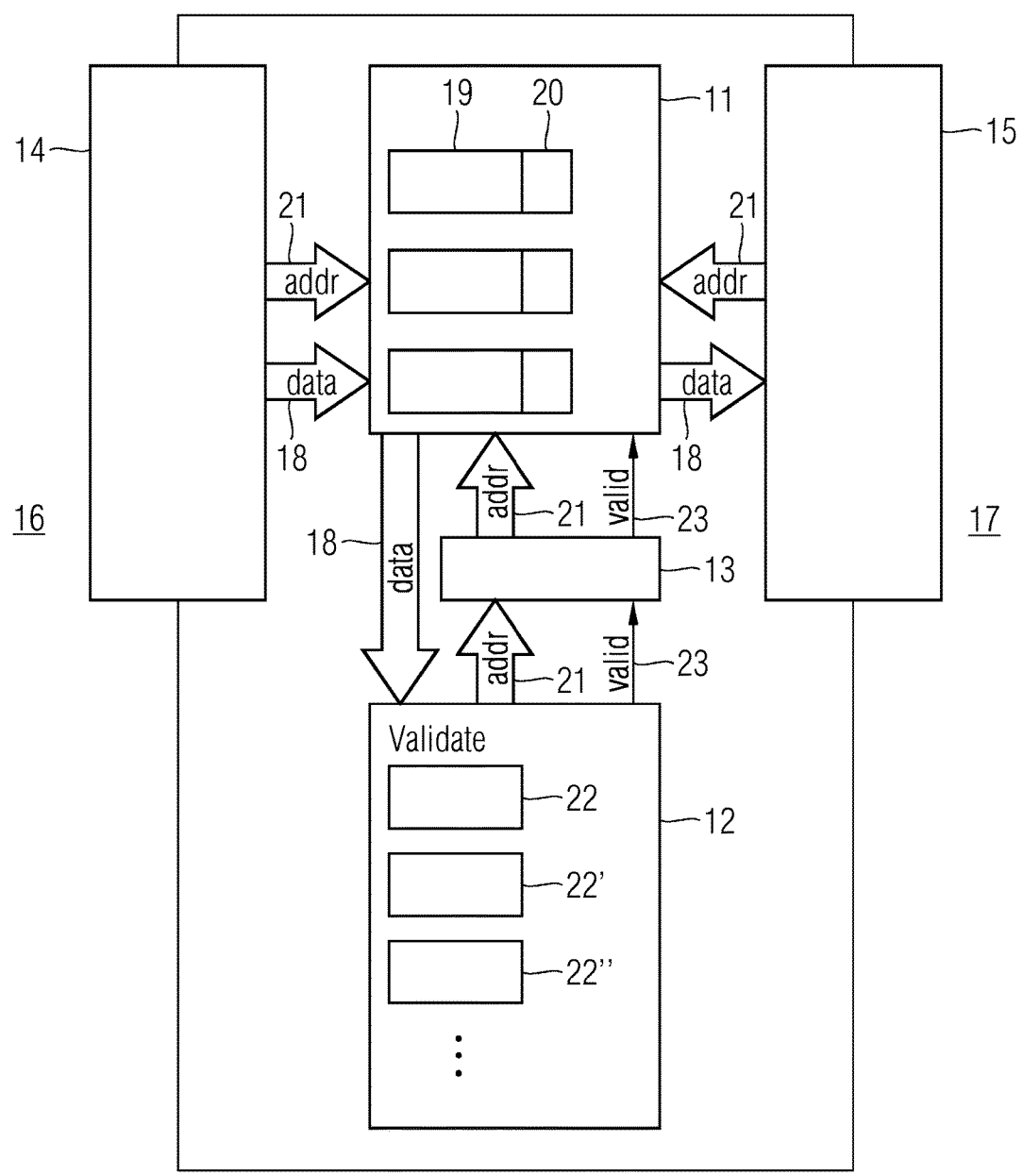
FIG. 1 shows a first embodiment of a data storage device including a storage unit and a first interface and a second interface.

FIG. 1 shows one exemplary embodiment of a data-validating data storage device including two interfaces 14, 15 for exchanging data securely between two security zones 16, 17. The data exchange is carried out by a data synchronization with a data validation in which data elements 18 acquired via a first interface 14 are read into a first storage unit 11 and are made visible to the second interface 15 and thus are readable only after a validation. This enables a controlled data exchange between an external zone (e.g., security zone 16) and a zone having a high protection requirement (e.g., security zone 17), in which, for example, control communication between control apparatuses or a real-time communication takes place. In this case, a security zone may be operated as a closed network since no network communication with another security zone is realized. Only selected, projectable data elements 18 are provided for the second security zone 17 insofar as a data validation has revealed nothing conspicuous. This likewise provides freedom from perturbations from an external network (e.g., in security zone 16) to a closed network (e.g., security zone 17). No data elements that do not correspond to a pattern underlying the validation are transmitted.

The storage unit 11 is also connected to a validation unit 12 and an access control unit 13. The validation unit 12 is likewise connected to the access control unit. From the storage unit 11, for example, the data elements 18 read in are forwarded to the validation unit 12 directly or as a copy and are checked there with respect to at least one pattern and are thus validated. From the validation unit 12, the validated data elements 18 and/or information about a validation result (e.g., whether a data element was validated as valid or invalid) are transferred to the access control unit 13. The access control unit 13 then forwards the data elements and/or information to the storage unit 11.

The data storage device 10 illustrated in FIG. 1 includes a first interface 14, via which data elements 18 are read in from a security zone 16 into a memory cell 19 of the storage unit 11 with indication of a memory address 21 that identifies a memory cell 19. In this case, the storage unit 11 is configured such that only a reading access to the storage unit 11 is possible from the first interface 14. The storage unit 11 is also configured such that only a reading access is allowed from a second interface 15 that is in contact with the second security zone 17.

The storage unit 11 is embodied as a dual port RAM (DPRAM), for example, which permits both reading and writing access from both interfaces 14, 15. In this case, the side from which a reading or a writing access is permissible may then be defined at the memory cell level.

In a further variant, reading and writing access to a memory cell 19 may be carried out both from the first interface 14 and from the second interface 15. Here, too, a read access to the content of the memory cell is possible only after successful validation. If appropriate, the validation of the data elements (e.g., which one or more patterns are used for checking the data elements) may be dependent on whether the write access is carried out from the first interface 14 or from the second interface 15.

The validation unit 12 is configured to store at least one pattern 22. Further patterns 22', 22" may be loaded via an interface that is not illustrated or else via the first interface 14 to the validation unit 12 and may be stored there. A validation configuration may be defined for a plurality of memory cells 19 or each individual memory cell 19. A validation configuration includes one or a plurality of patterns 22, 22', 22" with respect to which one or a plurality of data elements 19 are checked and are accepted as validly validated only in the event of correspondence.

Patterns 22, 22', 22" include, for example, a format or a file type of the data element or a value range to which the data elements are to correspond. A pattern 22, 22', 22" may likewise include predetermined checksums for one or a plurality of data elements or dependencies of a plurality of data elements with respect to one another or a temporal dependence of a plurality of data elements. In the case of a check with respect to a pattern 22, 22', 22" with checksums, the checksums may have been determined according to a cyclic redundancy check CRC or by a hash algorithm (e.g., SHA1), or by cryptographic message integrity codes such as AES-CBC-MAC, HMAC-SHA1 or by digital signatures.

In the case of a pattern having dependencies of a plurality of data elements, for example, a sequential analysis over a plurality of data elements 18 is carried out or a cross-comparison with other memory cells 19 or the data elements 18 thereof is carried out. In the case of a pattern having temporal dependencies, for example, the period of time since the last write access is checked with respect to a desired value.

If a data element 18 is verified as valid by the validation unit 12, a validation message 23 with indication of the memory address 21 of the memory cell 19 in which the verified data element 18 is stored is reported to the access control unit 13. The access control unit 13 forwards the address information 21 and the validation message 23 to the storage unit 11. Only after a valid validation is the memory cell 19 provided with a validation identifier 20. Only memory cells 19 having a validation identifier 20 are enabled for reading via the interface 15.

If a written data element 18 was validated as invalid, the access control unit 13 provides a replacement value or an invalid value or else an additional information item and transfers this to the storage unit 11. The storage unit 11 is thus readable by a user of the second security zone 17 via the second interface 15. In the case of one or a specific number of data elements validated as invalid, the access control unit 13 may also treat all or a portion of the data elements validated as valid in the same way as the data element validated as invalid.

Additionally or alternatively, the access control unit 13 may block writing access to the memory cell 19 if one or a plurality of data elements 18 were validated as invalid. This is communicated to the storage unit 11, 111 by the validation message 23 and 123, respectively, in the exemplary embodiment 100, 200 of the data storage device. The validation message 123 in the exemplary embodiment 100, 200 of the data storage device is communicated from the access control unit 113 via the validation unit 112 or else directly from the access control unit 113, not illustrated, to the first storage component 111.

As a further option, the access control unit 13, in the case of one or a plurality of data elements validated as invalid, instigates a resetting of the memory cell 19 containing the data element validated as invalid. Alternatively, a partial region of the storage unit 11, in the case of a data element validated as invalid, may be reset or instigate a resetting of all the memory cells 19 of the storage unit 11.

Alternatively, the access control unit 13 deactivates the entire data storage device 10.

For reading a memory cell 19, the second interface 15 communicates the memory address 21 of the desired memory cell 19 and in return receives the requested data element 18. Memory cells 19 without a validation identifier 20 are blocked for the read access. This provides that memory cells 19 may not be read during the validation. As a result, memory cells that were validated as invalid may likewise remain blocked since the memory cells do not obtain a validation identifier 20. During renewed writing to a memory cell via the first interface 14, the validation identifier 20 is erased.

Figure 2:
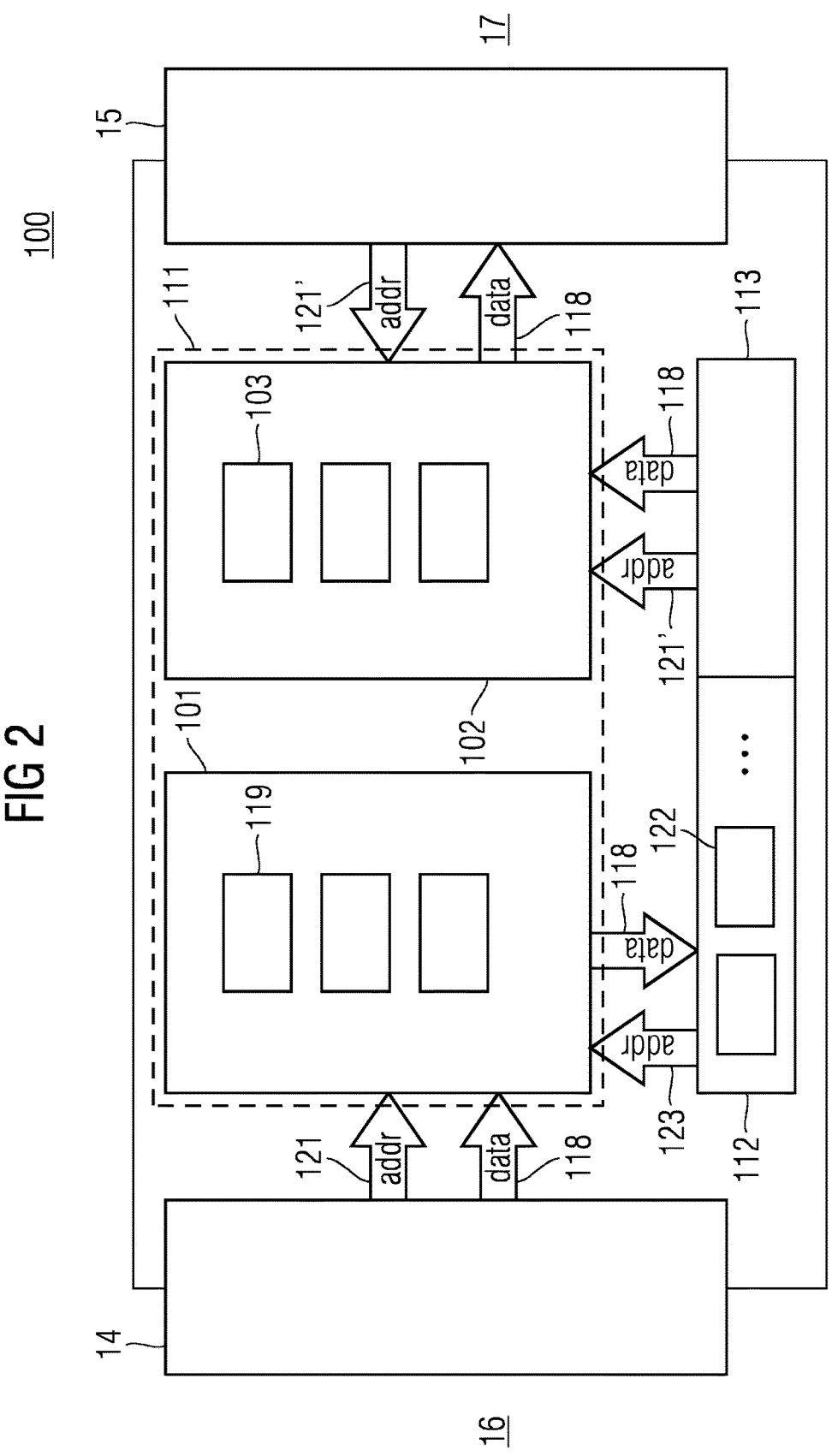
FIG. 2 shows a second embodiment of a data storage device including a storage unit formed from two separate storage components in schematic illustration.

FIG. 2 illustrates a further embodiment of the data storage device 100. The data storage device 100 includes a first interface 14 to a first security zone 16 and a second interface 15 to a second security zone 17. The interfaces 14, 15 are connected to a storage unit 111, and the storage unit 111 is in turn connected to a validation unit 112 and an access control unit 113, which are, for example, embodied as an integrated unit.

The storage unit 111 includes a first storage component 101 that has only one interface to the first interface 14. A write-only access to the storage component 101 is possible via the first interface. Further, the storage unit 111 includes a second storage component 102 that has a read-only access with respect to the second interface 15. Data elements 118 read in via the first interface 14 are stored in the memory cell 119 determined via the address information 112. A data exchange between the first interface 14 and the second interface 15 takes place, for example, by the data elements 118 being copied over from the first storage component 101 into the validation unit 112.

In the validation unit 112, as described in the previous exemplary embodiment 10, the data elements 118 are checked based on validation information including one or a plurality of patterns 122. If a data element 118 is validly validated, the data element 118 is transferred via the access control unit 113 to the second storage component 102 with indication of the address 121' of the memory cell 103 to which the data element is written. Via the second interface 15, the data element 118 may then be read out with indication of the memory address 121' of the memory cell 103.

Figure 3:
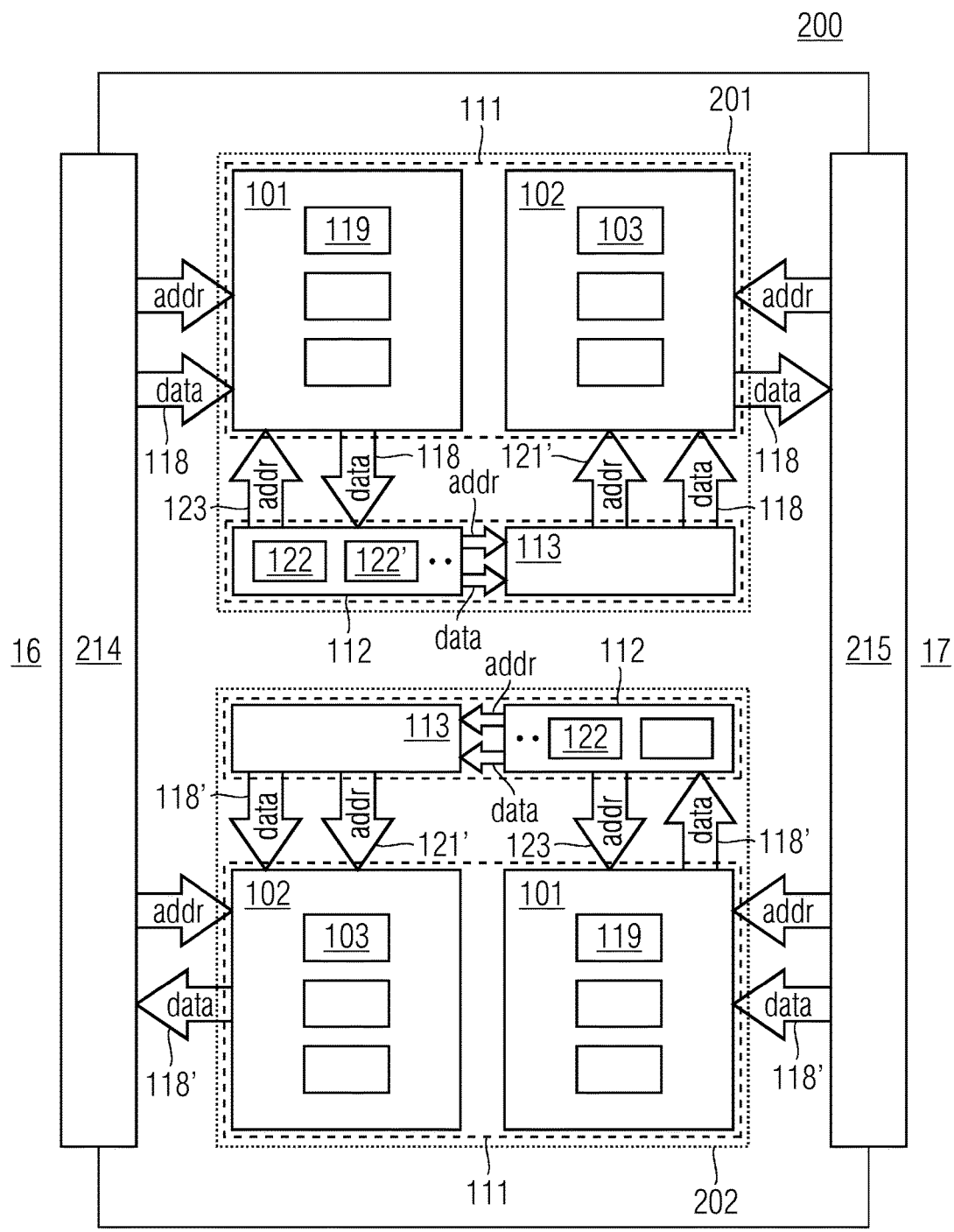
FIG. 3 shows a third exemplary embodiment of a data storage device including two storage regions for a data exchange in outgoing and return directions in schematic illustration.

In this exemplary embodiment, the validation unit 112 and the access control unit 113 are embodied in a manner integrated as one component. A separate embodiment, as illustrated in FIG. 1 or FIG. 3, is likewise possible. The functions of the validation unit 112 and of the access control unit 113 correspond to the functions of the validation unit 12 and of the access control unit 13, respectively, of the exemplary embodiment 10. In the exemplary embodiment 100, the data elements 118 are copied over from the validation unit 112 to the access control unit 113 and from there, are transferred to the second storage component instead of only a validation message 23 being sent to the storage unit 11 and a validation identifier 20 thereupon being allocated to the corresponding memory cell.

In order to enable a data exchange in both directions, the internal construction of the data storage device 10, 100 may be arranged in a doubled and mirrored fashion. Such an arrangement is illustrated in FIG. 3. In the exemplary embodiment 200 of a data storage device enabling a data exchange in both directions, a first interface 214 to a first security zone 16 and a second interface 215 to a second security zone 17 are embodied. A first storage region 201 enables the exchange of data from the first security zone 16 to a second security zone 17, and the second storage region 202 enables a validated data exchange from the second security zone 17 via the second interface 215 to the first interface 214 and the first security zone 16 behind that.

In the data storage device 200 illustrated, the first and second storage regions 201, 202 respectively correspond to a storage unit 111 of the data storage device 100 together with in each case a validation unit 112 and an access control unit 113. In this case, the validation unit 112 and the access control unit 113 are embodied as separate components. Both storage regions 201, 202 operate independently of one another. In this regard, for the different directions, different patterns 122, 122' may be defined and validated, and thus, different validation information items for checking the data elements 118 may be defined and validated. Instead of a respective validation unit 112 and a respective access control unit 113 per storage region 201, 202 and thus transmission direction, a common validation unit and/or access control unit, not depicted, may also be embodied. If only one access control unit and one validation unit are embodied for both directions, then the access control unit and the validation unit contain, respectively, separate patterns and validation information items for the different directions, and the check and the access control functions are applied in accordance with the specifications for the respective transmission direction.

The data elements that are exchanged via the data storage device 10, 100, 200 may be, for example, state data, diagnosis data or control data of a control system. These may be data to be written or provided cyclically, for example, such that data are to be written or read in a predetermined time frame. The data may likewise be actuator values that are usable in a control environment directly as input for a control apparatus.

The first interface 14, 214 and/or the second interface 15, 215 correspond(s), for example, to the I2C, SPI, RS232, RS435, USB, memory card interface or communication interfaces in accordance with an Ethernet, Profinet IO, IP, FTP, scp, HTTP, HTTPS, CoAP, OPC, OPC UA standard.

In a variant that is not illustrated, the data storage device 10, 100, 200 includes a third interface that is accessible from the first security zone 16. Via the third interface, data elements 18, 118 written via the first interface 14, 214, 215 to the storage unit 11 or to the first write-only storage component 101 of the storage unit 111 may be copied and read out. It is thus possible to monitor "eavesdropping" or monitoring of the writing first interface 14, 214, 215. This provides freedom from perturbations during data transmission into the second security zone 17 or during read-out of the data via the second interface 15, 214, 215. Only written values within a security zone are intercepted, but without influencing the communication within the security zone.

The data storage device 10, 100, 200 may be embodied, for example, as a hardware assembly (e.g., as a field programmable logic gate arrangement FPGA as an application specific integrated circuit ASIC or as a system on an integrated circuit). However, the described data storage devices 10, 100, 200 may also be used as a data-validating memory access unit that blocks a read access to a storage region of a separate storage assembly after a write access and enables the read access after validation has been carried out.

All features described and/or depicted may be combined advantageously with one another within the scope of the invention. The invention is not restricted to the exemplary embodiments described.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A data storage device for protected data exchange between different security zones, the data storage device comprising:
   a hardware storage unit;
   a hardware validation unit; and a hardware access control unit,
wherein the storage unit has a first interface to a first security zone, via which data elements are only writable to the storage unit, and the storage unit has a second interface to a second security zone, via which data elements are only readable from the storage unit,
wherein the validation unit is configured to check the data elements written to the storage unit for correspondence with a predetermined pattern, and the access control unit is configured to enable the data elements to be read out from the storage unit only when the data elements are found to be corresponding and thus validly validated.

2. The data storage device of claim 1, wherein the storage unit comprises a plurality of memory cells, and a check identifier is assignable to each memory cell of the plurality of memory cells,
wherein a check identifier is assigned only to a memory cell of the plurality of memory cells with a validly validated data element and the memory cell is enabled for a reading access only in the case of an assigned check identifier.

3. The data storage device of claim 1, wherein the storage unit comprises a first storage component which that allows write-only access with respect to the first interface and forwards the written data elements to the validation unit, and
wherein the storage unit comprises a second storage component that reads in data elements from the access control unit and allows read-only access with respect to the second interface.

4. The data storage device of claim 1, further comprising a plurality of storage regions, a storage region of the plurality of storage regions comprising a storage unit, a validation unit, an access unit, or any combination thereof, and each storage region of the plurality of storage regions transporting data elements in different directions, respectively, and
wherein the validation unit checks the data elements for each direction for correspondence with a dedicated pattern independent of an opposite direction or other directions.

5. The data storage device of claim 4, wherein the plurality of storage regions have a different storage capacity.

6. The data storage device of claim 1, wherein, for a written data element having a value validated as invalid, the access control unit is configured to provide a replacement value or an invalid value or an additional information item.

7. The data storage device of claim 1, wherein the access control unit is configured to block reading access to a data element when the data element is validated as invalid.

8. The data storage device of claim 6, wherein the access control unit, in the case of one or a specific number of data elements validated as invalid, treats all or a portion of the data elements validated as valid in the same way as the data element validated as invalid.

9. The data storage device of claim 1, wherein the access control unit is configured to deactivate the complete data storage device when one or a plurality of written data elements are validated as invalid.

10. The data storage device of claim 1, wherein the access control unit is configured to block writing access to the storage unit when one or a plurality of data elements are validated as invalid.

11. The data storage device of claim 10, wherein the access control unit, in the case of one or a plurality of data elements validated as invalid, is configured to instigate a resetting of memory cells, is configured to instigate a resetting of a partial region in which the data element validated as invalid is stored, or is configured to instigate a resetting of all memory cells of the storage unit.

12. The data storage device of claim 1, wherein at least one third interface is accessible from the first security zone and duplicates and reads out the data elements written via the first interface from the first security zone to the storage unit.

13. The data storage device of claim 1, wherein a written data element comprises an actuator value, and the data element read out into a control environment is usable directly as input.

14. The data storage device of claim 1, wherein the validation unit is configured to store, to load a plurality of different patterns, or a combination thereof.

15. The data storage device of claim 1, wherein the validation unit is configured to validate data elements with respect to a plurality of patterns, and the access control unit allows a reading access only when at least one or a specific minimum number of patterns or a logical combination of patterns are validly validated.

16. The data storage device of claim 1, wherein a pattern is a format, a file type, a value range, a valid checksum, a correspondence of dependencies of a plurality of data elements with respect to one another, or a temporal dependency of a plurality of data elements.

17. The data storage device of claim 1, wherein the first interface, the second interface, or the first interface and the second interface are configured as interfaces in accordance with the I2C, SPI, RS232, RS435, USB, SD card standard or an Ethernet, Profinet IO, IP, FTP, scp, HTTP, HTTPS, CoAP, OPC or OPC UA standard.

18. The data storage device of claim 1, wherein the data storage device is configured in the form of a hardware assembly as a field programmable logic gate arrangement, an application specific integrated circuit, or a system on an integrated circuit.

* * * * *